Figure 1:
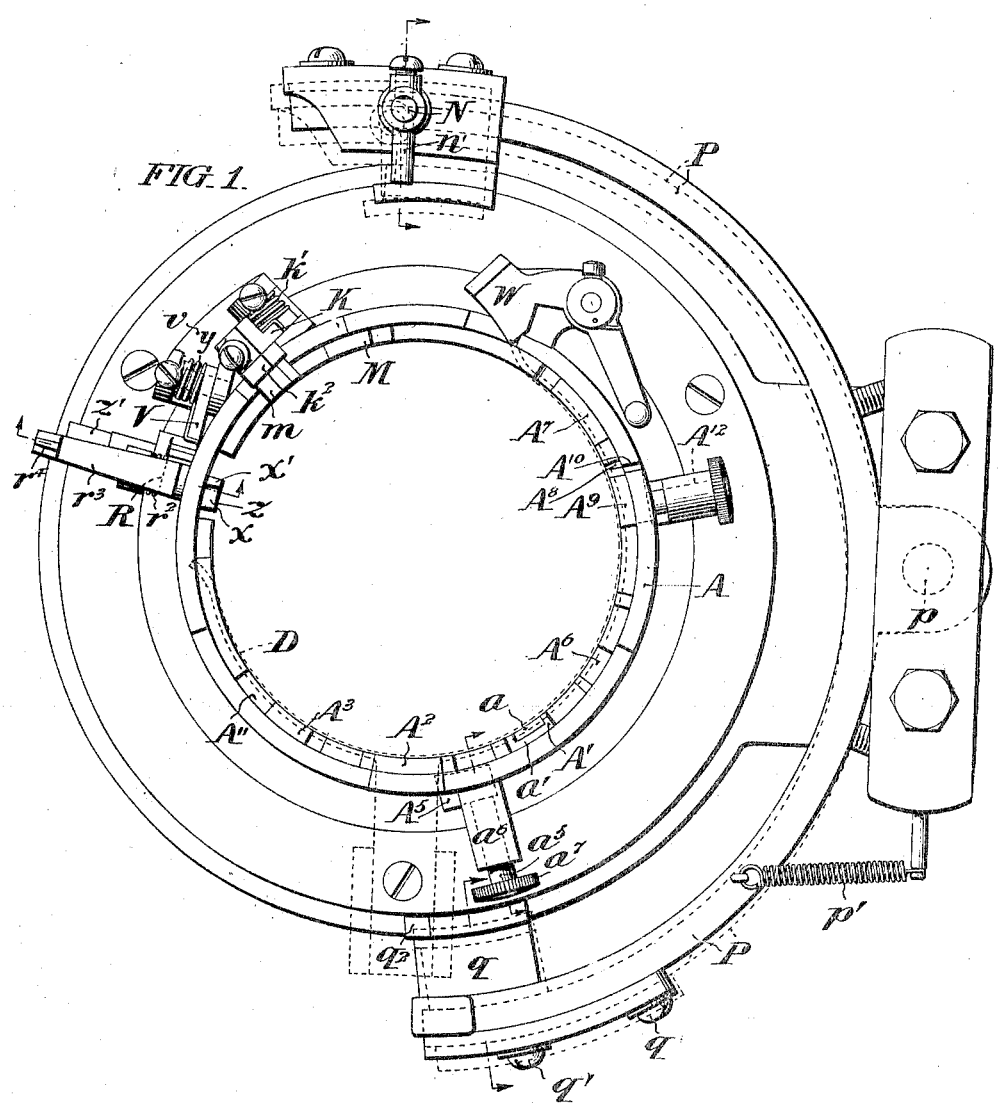

No. 811,577. PATENTED FEB. 6, 1906.
J. B. PAXTON & E. I. O'NEILL.
CIRCULAR KNITTING MACHINE.
APPLICATION FILED SEPT. 30, 1903.

5 SHEETS—SHEET 1.

WITNESSES:

INVENTORS

No. 811,577. PATENTED FEB. 6, 1906.
J. B. PAXTON & E. I. O'NEILL.
CIRCULAR KNITTING MACHINE.
APPLICATION FILED SEPT. 30, 1903.
5 SHEETS—SHEET 2.
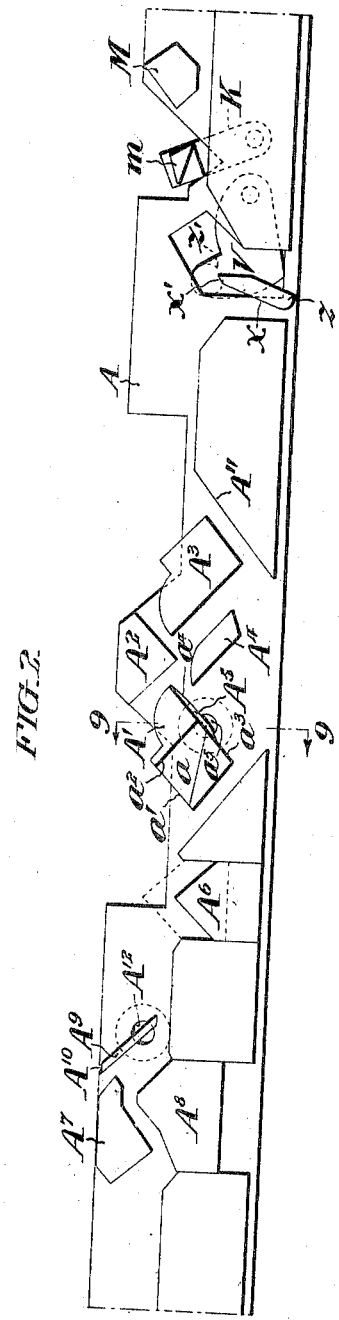
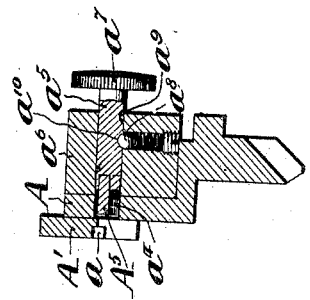
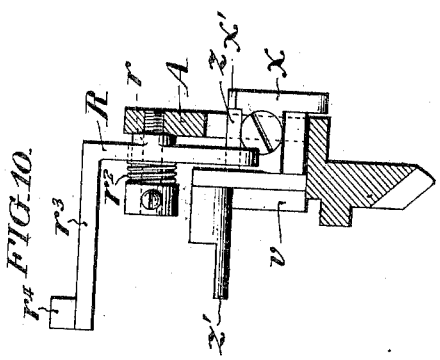
WITNESSES:
INVENTORS No. 811,577.
PATENTED FEB. 6, 1906.
J. B. PAXTON & E. I. O'NEILL.
CIRCULAR KNITTING MACHINE.
APPLICATION FILED SEPT. 30, 1903.
5 SHEETS—SHEET 3.
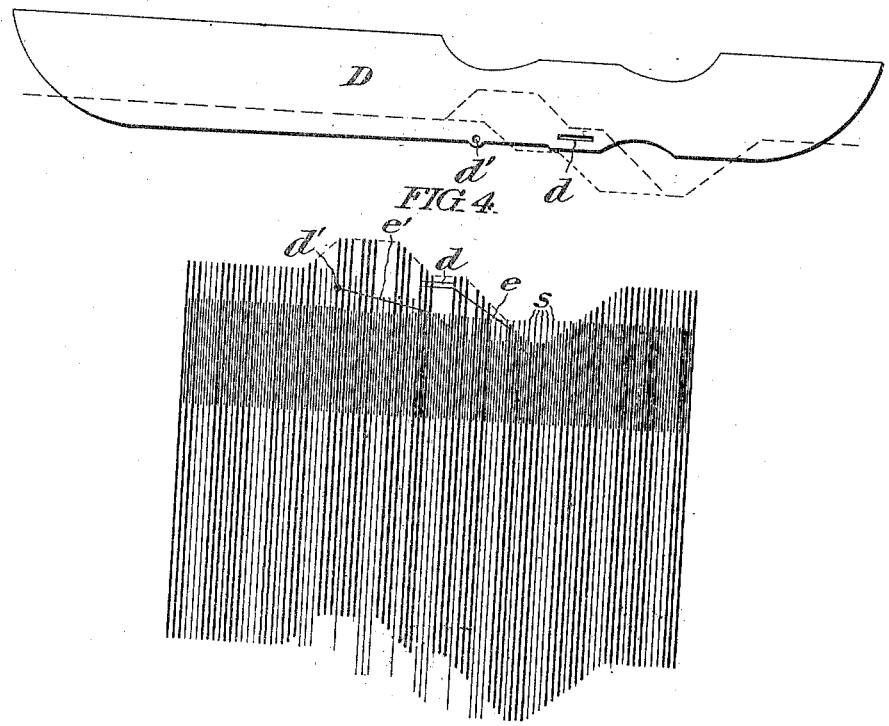
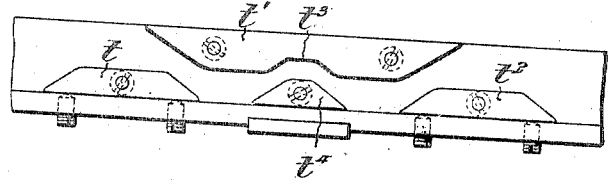
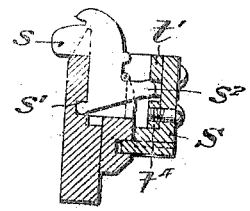
WITNESSES:
INVENTORS No. 811,577. PATENTED FEB. 6, 1906.
J. B. PAXTON & E. I. O'NEILL.
CIRCULAR KNITTING MACHINE.
APPLICATION FILED SEPT. 30, 1903.

5 SHEETS—SHEET 4.

WITNESSES

INVENTORS

No. 811,577. PATENTED FEB. 6, 1906.
J. B. PAXTON & E. I. O'NEILL.
CIRCULAR KNITTING MACHINE.
APPLICATION FILED SEPT. 30, 1903.

5 SHEETS—SHEET 5

WITNESSES:

INVENTORS
John B. Paxton and
Ellis I. O'Neill
by their attorneys

UNITED STATES PATENT OFFICE.

JOHN B. PAXTON AND ELLIS I. O'NEILL, OF PHILADELPHIA, PENNSYLVANIA.

CIRCULAR-KNITTING MACHINE.

No. 811,577.      Specification of Letters Patent.      Patented Feb. 6, 1906.

Application filed September 30, 1903. Serial No. 175,244.

*To all whom it may concern:*

Be it known that we, JOHN B. PAXTON, residing at No. 331 Saunders street, and ELLIS I. O'NEILL, residing at No. 1824 Venango street, in the city and county of Philadelphia and State of Pennsylvania, have invented certain new and useful Improvements in Circular-Knitting Machines, whereof the following is a specification, reference being had to the accompanying drawings.

Our improvements relate primarily to certain means which we have invented whereby we produce vertically-striped knitting. This we have shown and will describe as we have applied it to a circular-stocking knitter, it being, however, understood that the same process of knitting and similar means for accomplishing it may be employed in other varieties of knitting-machines.

According to our invention the striping operation is accomplished by cams which sufficiently separate two sets of needles so that the stitch-forming depression of the two sets of needles is effected separately by two substantially parallel stitch-cams, both of which cams deliver the needles of their set to the same cam to be reraised to their normal level. By feeding a different thread to the needles of each series it results that one series of needles knits only with one thread, while the other series knits only with the other thread, the non-knitting thread being in each case floated across the space occupied by the needles by which it is not knit. This process of knitting we have described and claimed in an application for United States Letters Patent filed simultaneously herewith as Serial No. 175,245. As described in that application the separation of the two sets of needles to cause them to pursue different stitch-forming paths does not necessarily involve any difference in the structure of the needles of the two sets, for their sorting may be accomplished by any known means. We prefer, however, in order to the more readily accomplish the sorting of the needles into their different paths to employ classified needles—that is to say, needles of two different sorts, one sort corresponding to one set and the other to the other set. In the embodiment of our invention which we have illustrated this difference between the needles takes the form of a difference in the length of the needle-butts, some of the needles having full-length and some half-length butts. We have also devised means whereby both the separation of the needles and their separate stitch-forming depression is accomplished within the region of an ordinary set of reciprocatory knitting-cams and with but slight modifications or additions to the same.

In the accompanying drawings we have illustrated the cam-cylinder of a knitting-machine embodying our invention, but to avoid complication have omitted any detailed representation of the needle-cylinder and needles and automatic pickers for finishing the heel and toe of the stocking and various other well-known parts, deeming it only necessary to show in detail those special elements which directly comprise the features of invention and the relation of said elements to the usual components of this class of knitting-machines.

Figure 5:
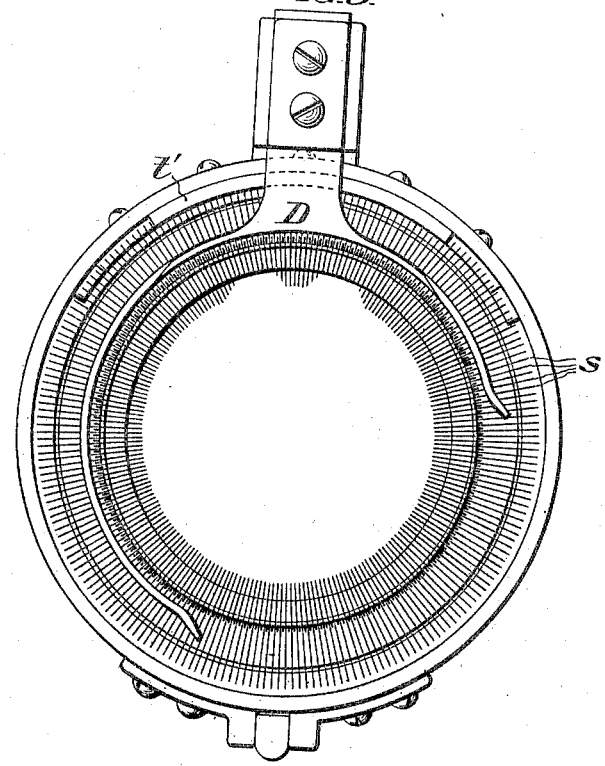
Figure 8:
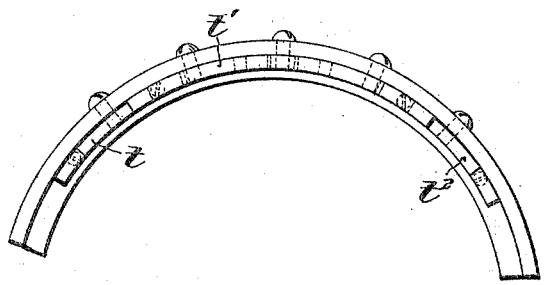
Figure 11:
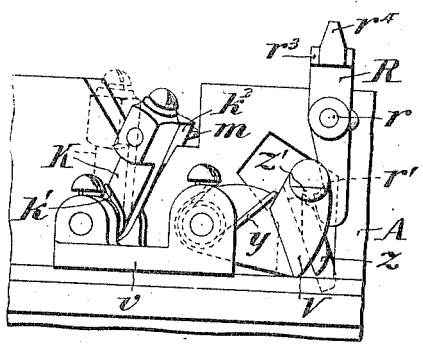
Figure 12:
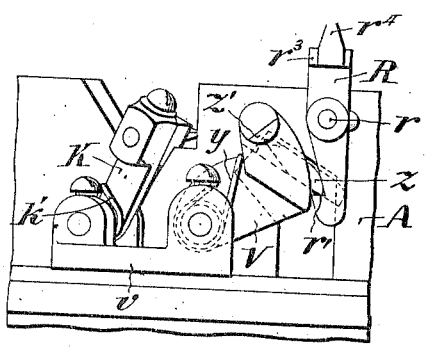
Figure 13:
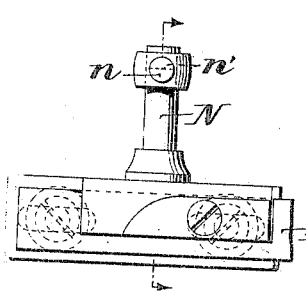
Figure 14:
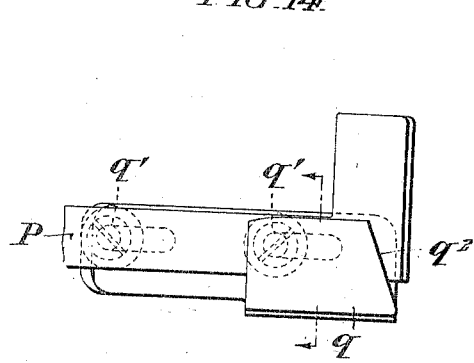
Figure 15:
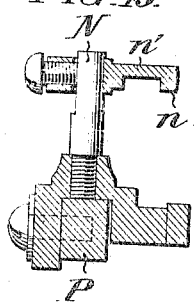
Figure 16:
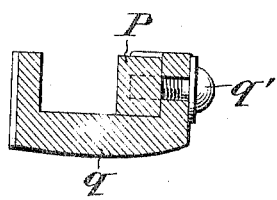

In said drawings, Figure 1 is a plan view of a cam-cylinder embodying our improvements. Fig. 2 is a diagrammatic view of the interior surface thereof, developed upon a plane. Fig. 3 is an elevation of the latch-guard, with its thread-eyes, developed upon a plane, with diagrammatic lines indicating the movement of the needle groups with reference to the thread-eyes. Fig. 4 is a diagrammatic view illustrating the needle groups themselves in the respective positions which they occupy at a given moment in circular knitting. Fig. 5 is a plan view of the sinker-ring with the sinkers and needles *in situ*. Figs. 6, 7, and 8 are detail views of the sinker-cams. Fig. 9 is a cross-section taken at 9 9, Fig. 2. Figs. 10 to 16, inclusive, are detail views of the switch-up cam and its actuating mechanism.

Referring to the general views of Figs. 1 and 2, A represents the wall of the cam-cylinder with the usual needle ledge or groove. This groove is interrupted by various cams, as follows: A' is that stitch-cam which during continuous rotation of the machine is in advance, and which we will therefore call the "leading" stitch-cam. $A^2$ is the top center cam. $A^3$ is the following stitch-cam. $A^4$ is a special stitch-cam. The depth of all of these cams is such that they engage both short and long butt needles, with the exception that the leading stitch-cam A' has a transverse channel formed across its inner face, as indicated at $a$, which, because it has not the full radial depth of the cam itself, leaves a shoulder or cam-surface $a'$ on the upper edge of the cam, which is so shallow as to engage only the long-butt needles, allowing the short-butt needles to pass across the channel $a$ without engagement. The channel $a$ has a downwardly-inclined upper wall $a^2$ of such radial depth as to engage and carry down the short-butt needles that have passed into the channel through the opening at the front end thereof. Said channel-wall $a^2$ terminates downwardly at a level which is below the upper end of the special stitch-cam $A^4$, the general inclination and lower limit of which corresponds with the adjacent down-throwing edge of the following stitch-cam $A^3$. This supplemental or special stitch-cam $A^4$ is therefore the loop-forming stitch-cam for the short-butt needles which have passed through the channel $a$, while the corresponding edge of the following stitch-cam $A^3$ performs that function for the long-butt needles. Both sets of needles are raised again to the normal level by the return-way formed between the stitch-cam $A^3$ and the ledge-cam $A^{11}$. In continuous-circular knitting the under or rear face $a^3$ of the leading stitch-cam $A'$ is of course non-operative, the function of said rear face being only called into play during the process of reciprocatory knitting, as during the widening and narrowing operation. Whenever said rear face is to be operative at all, it must be operative upon all the needles, whether they have long or short butts, and hence at such times the channel must be closed at the end corresponding to said rear face, since otherwise the short-butt needles would on the return reciprocation only descend along the face $a^3$ until they reached the opening of the channel $a$ and would then pass into the same, thus escaping complete depression. We therefore combine with said rear face $a^3$ of the leading stitch-cam $A'$ a movable gate-cam $A^5$, by which the opening of the channel $a$ at that end can be closed when desired. The details of the gate-cam $A^5$ and its mounting devices are shown clearly in Figs. 1 and 9. By reference to these views it will be seen that an elongated slot $a^4$ is formed through the wall of the cam-cylinder immediately beneath the face $a^3$, extending from the upper limit thereof to a point below the lower edge of the channel $a$. The gate-cam $A^5$ itself consists of an elongated strip fitting snugly in said slot and capable of projection and withdrawal through the same. The gate-cam is mounted upon a horizontal stem $a^5$, sliding longitudinally in a boss $a^6$ upon the outer face of the cam-cylinder A, said stem having at its outer end a milled head $a^7$ for convenience of handling and being maintained in its extreme inner and outer positions by a spring-actuated detent $a^8$, having a rounded end which engages lightly with either of two shallow depressions $a^9$ $a^{10}$ formed in the periphery of the stem $a^5$, so that by the application of moderate force in a longitudinal direction the stem may be shifted in or out of the relation to the wall of the cylinder, but will be held against accidental displacement. The radial depth of the gate-cam $A^5$ is substantially equal to the full radial depth of the leading stitch-cam $A'$. Hence when the said gate-cam is protruded into the cam-cylinder it presents a continuous surface for engagement with all of the needles irrespective of the length of their butts, so that the rear face of the leading stitch-cam is operative upon both sets of needles during the reverse motion of receprocation. By the coöperation of the parts thus far described it will therefore be understood that if the needle-cylinder is set so as to contain groups of long and short butt needles in alternation and if the cam-cylinder is continuously rotated in the normal direction all the needles of the long-butt set will be operated upon by the stitch-cams in the usual manner for ordinary knitting, while all the short-butt needles, by reason of their entering groove $a$, will fail to receive the preliminary advance necessary to cause them to throw off their loops below their latches before they perform their stitch-forming descent. This of course would prevent the short-butt needles from knitting. In order to provide for the preliminary advance of these needles, we insert in advance of the stitch-cams a special group of cams, (indicated at $A^7$, $A^8$, and $A^9$.) Of these $A^7$ is a guard-cam of usual construction. $A^8$ is a cam set in the needle-groove, so as to compel the advance of all the needles as they pass over it to the point which throws the loops which they carry below the latches. $A^9$ is the returning-cam, which is slidingly mounted within a slot $A^{10}$ in the wall of the cam-cylinder. It is supported and manipulated in a manner similar to that just described in connection with the cam $A^5$, the supporting-stem for said cam $A^9$ being indicated on Fig. 1 at $A^{12}$. The radial depth of all of these three cams $A^7$ $A^8$ $A^9$ is such as to come into engagement with all of the needles. As far as the long-butt needles are concerned, its function is unnecessary but harmless, simply resulting in the loops upon these needles being thrown below the latches a little in advance of the usual point. For the short-butt needles, however, its function is essential, as otherwise, for the reasons heretofore explained, they would not be advanced sufficiently to throw their loops below their latches, and consequently would not knit. The function of the cam $A^9$ when protruded into the cylinder is to return all of the needles to the normal level, so as to insure the entrance of the short-butt needles into the groove $a$. It is made removable in order that during reciprocatory knitting, when it is desired that all of the needles shall knit with the same thread, it may be withdrawn, so that all of the needles will during reverse motion be passed over cam A' and be depressed by the center cam A² and the following stitch-cam A³.

A⁶ is a movable jack-cam, which can be adjusted in either of the two positions indicated by the solid and dotted lines of Fig. 2. The depth of this cam is such as to engage all of the needles. If it were mechanically convenient to place the cams A⁷, A⁸, and A⁹ at the point where the cam A⁶ is situated, the presence and function of this latter cam would be unnecessary. In our machine, however, owing to the presence of automatic picker mechanism, (not shown, but occupying the cut-away portion of the cam-cylinder which appears in Fig. 2 in the region of the stitch-cams,) we have not found it convenient to place the cams A⁷ A⁸ A⁹ so near to the stitch-cams. During reciprocatory knitting, however, it is sometimes necessary that the elevation of the short-butt needles preparatory to their stitch-forming depression shall occur at a less distance from the stitch-cams than is the cam A⁸; otherwise as the cylinder reciprocates some of these short-butt needles might enter the channel $a$ without preliminary advance, and be thereby not only withdrawn from the knitting operation, but broken off against the gate-cam A⁵. In order to prevent this contingency, we provide the cam A⁶, which during reciprocatory knitting is elevated to its full extent, but is otherwise depressed to its inoperative position.

Recapitulating what has already been stated, it will be understood that during ordinary round-and-round knitting when striped fabric is to be knit the cam A⁹ is protruded, the cam A⁶ is depressed, and the cam A⁵ withdrawn. On the other hand, during reciprocation when plain knitting only is to be produced the cam A⁹ is withdrawn, the cam A⁶ elevated, and the cam A⁵ protruded.

We will next describe the thread-guides and the process of knitting whereby we produce vertical stripes by the use of our device.

An upright post fast to the cam-cylinder carries the usual latch-guard D. (See Figs. 3 and 5.) This latch-guard is pierced by two thread-guides.

$d$ is the usual slotted thread-guide, feeding thread under the hooks of the needles which are being depressed by the following stitch-cam A³.

$d'$ is a second thread-guide formed on the lower edge of the latch-guard a little in advance of $d$ and feeding thread under the hooks of the needles which are being depressed by the special stitch-cam A⁴.

If reference now be had to Fig. 4, it will be observed that the needles are divided into two sets, (distinguished by the light or heavy line representing them.) The light lines represent the short-butt needles and the heavy lines the long-butt needles. These two kinds of needles are interspersed among each other in alternating groups arranged according to the desired pattern for the stripes which are to be knit. Threads which may differ in color, texture, or otherwise are fed through the two thread-guides. The thread which is fed through $d'$ is engaged by the hooks of the short-butt needles only and knit by them, while the thread which is fed through $d$ is engaged by the hooks of the long-butt needles only and knit by them. Each thread is floated across the spaces occupied by the needles with which it is not engaged and knit, the float-threads passing to the back of the fabric at the point corresponding to the base of the following stitch-cam A³, where all of the needles are depressed to their utmost extent, so that as the needles rise again under the influence of the ledge-cam A¹¹ they are in front of the float-threads. The result is a striped knit fabric of ordinary knitting with float-threads of the opposite color or kind running across the back of each stripe. In Fig. 4 the line which each of these threads takes as it runs under the hooks of the descending needles is indicated, the thread from $d$ being lettered $e$ and the thread from $d'$ being lettered $e'$. It will be seen that although the thread $e$ runs by a straight line to the point where it is knit the thread $e'$ is upwardly deflected before it reaches the stitch-forming point. This is accomplished by a special motion of the sinkers, which we will now describe.

The sinkers $s$ (shown in outline in Fig. 7 and also indicated by the short lines in Fig. 4) are of the pivoted or tilting variety, with their fulcrum in a groove $s'$ in the needle-cylinder. The rear arms $s^2$ of the sinkers project out into the plane of a sinker-ring S, fitted with sinker-cams $t\ t'\ t^2$. Of these $t'$ is the main sinker-cam, which effects the withdrawal of the sinkers from the knitting-line in the region where the stitch-forming operation takes place. $t\ t^2$ are guard-cams. The cam $t'$ is of unusual construction in that it is made with a depression $t^3$ about in its center, said depression being opposed to an auxiliary cam $t^4$, which causes the sinkers to momentarily advance and retract just before they reach the point where the thread $e'$ is fed to the short-butt needles. This movement will be best understood by observing the successive positions of the sinkers as illustrated in Figs. 4 and 5. Without the use of this auxiliary cam $t^4$ we have experienced some difficulty in the operation of our device unless the thread $e'$ is fed under considerable tension, such as only a moderately heavy yarn can bear. The difficulty appears to be this: If the sinkers are retracted, the thread $e'$ is compelled to run at a changing angle into the knitting, depending upon the position of the groups of needles by which it is not knit. When this angle changes suddenly, it occasions a slackening of the thread, which occasionally permits this thread to be caught or passed by the open latches of the long-butt needles, with the effect of its being drawn into the knitting at the wrong place. The momentary advance of the sinkers occasioned by the cam $t^4$ keeps this thread just at this critical point pressed closely against the outer edge of the shanks of the needles, so that the latches of the long-butt needles do not engage it. This explanation of the efficiency of this extra sinker-cam is that which best agrees with our observation of the working of the machine. It must be understood, however, that it is merely advanced as an opinion and that our claim for the use of this cam is based upon its proved efficiency irrespective of whether our explanation of the method of its operation be correct or not.

Where, as in the mechanism just described, long and short butt needles are interspersed in alternating groups among each other for the purpose of striping, it is impossible to employ this distinction between the lengths of the butts, as is otherwise often done, for the purpose of effecting the separation of the half-back series, which during the fashioning operation must be separated from the rest of the needles and be raised to the idle level. We have therefore devised a novel form of switch-up cam for the purpose of raising the half-back needles which in its action is independent of any difference between the needle-butts and which we will now briefly describe.

An arm V is pivoted upon the bracket $v$. Its free end has an inward projection $z$ (see Fig. 10) and an outer projection $z'$. The former passes through a slot in the cam-cylinder into the plane of the needle-butts, where it carries the cam-surface $x$, provided with a small bevel edge $x'$ at the upper end. The outer projection $z'$ constitutes a finger by means of which the cam is raised for operation. The coiled spring $y$ tends at all times to depress the arm V. It is raised by a swinging lever P, pivoted at $p$ to the bed-plate of the machine under the tension of the spring $p'$. One end of this lever carries a cam-piece $q$, adjustably secured to it by screws $q'$ $q'$ and furnished with the cam incline $q^2$. When the lever P is in the position of the drawings, this cam incline comes into contact with projection $z$, raising arm V. A trigger-arm R swings on a pivot $r$ and is provided with a notch $r'$ and a coiled spring $r^2$, which keeps this notch constantly pressed in the direction of the arm V. Accordingly when the arm is raised by the action of the cam incline $q^2$ it is engaged by the notch of the trigger and maintained in this position until approximately a half-rotation of the cylinder has occurred. Its release is effected by the downwardly-projecting end $n$ of a cross-piece $n'$, set on post N, mounted on the other end of the lever P. This coming into contact with a boss $r^4$ on the upper end $r^3$ of the trigger-arm is engaged by it, with the result of releasing the arm V, which immediately falls under the tension of its spring. An arm K is pivoted outside the cam-cylinder and is constantly depressed by the coiled spring $k'$. The free end of this arm carries a projection $k^2$, which reaches into the cam-cylinder, terminating in a triangular sorting-cam, which is a short distance in advance of a fixed cam M. By the action of these two cams any needles which the depression of the switch-up cam may leave in an intermediate position are accurately sorted and thrown either completely up or completely down. The switch-down cam to accompany this mechanism may be of any known form—as, for instance, the cam W. (Shown in Fig. 1.)

Having thus described our invention, we claim—

1. In a circular-knitting machine a cam-cylinder fitted with two substantially parallel stitch-cams in proximity to each other and with a common return-way; means for sorting the needles into groups and deflecting said groups alternately into the range of one or other of said stitch-cams; and two thread-guides each in position to feed its thread only to the needles which are depressed by one of said stitch-cams, substantially as described.

2. In a circular-knitting machine a needle-cylinder fitted with needles having long and short butts and arranged in alternating groups; a cam-cylinder with a set of reciprocatory knitting-cams, of which that stitch-cam which leads during rotary knitting is provided with a transverse channel of partial depth, across which the short-butt needles pass, while the long-butt needles are deflected over the cam; a supplemental stitch-cam intermediately placed with reference to the regular stitch-cams and having its cam incline substantially parallel to that of the following stitch-cam; and two thread-guides, one of which is in position to feed its thread only into the short-butt needles as they are depressed by the supplemental stitch-cam, and the other of which is in position to feed its thread only into the long-butt needles as they are depressed by the following stitch-cam; substantially as described.

3. In a knitting-machine, a striping device consisting of long and short butt needles arranged in alternating groups; a regular stitch-cam; a supplemental stitch-cam a short distance in advance of the regular stitch-cam and having a needle-depressing cam-surface substantially parallel to, but not reaching to the height of the corresponding surface of the regular stitch-cam; means whereby only the long-butt needles are passed over the supplemental stitch-cam, whereby the two sets of needles are simultaneously depressed in parallel relation to each other—the long-butt needles by the regular stitch-cam—and the short-butt needles by the supplemental stitch-cam; and two separate thread-guides corresponding to the two stitch-cams and each feeding its thread only to the set of needles which is depressed by its stitch-cam.

4. In a circular-knitting machine a needle-cylinder fitted with needles having long and short butts and arranged in alternating groups; a cam-cylinder with a set of reciprocatory knitting-cams, of which that stitch-cam which leads during the rotary knitting is provided with a transverse channel of partial depth across which the short-butt needles pass, while the long-butt needles are deflected over the cam; a movable gate-cam of full depth guarding the entrance of said transverse channel on the side of the cam which is operative when during the reverse motion of reciprocation, it becomes a following stitch-cam; a supplemental stitch-cam intermediately placed with reference to the regular stitch-cams and having its cam incline substantially parallel to that of the following stitch-cam; two thread-guides, one of which is in position to feed its thread only into the short-butt needles as they are depressed by the supplemental stitch-cam, and the other of which is in position to feed its thread only into the long-butt needles as they are depressed by the following stitch-cam, substantially as described.

5. In a circular-knitting machine a needle-cylinder fitted with needles having long and short butts and arranged in alternating groups; a cam-cylinder with a set of reciprocatory knitting-cams, of which that stitch-cam which leads during rotary knitting is provided with a transverse channel of partial depth, across which the short-butt needles pass, while the long-butt needles are deflected over the cam; a supplemental stitch-cam intermediately placed with reference to the regular stitch-cams and having its cam incline substantially parallel to that of the following stitch-cam; two thread-guides, one of which is in position to feed its thread only into the short-butt needles as they are depressed by the supplemental stitch-cam, and the other of which is in position to feed its thread only into the long-butt needles as they are depressed by the following stitch-cam; and a raising-cam in advance of said reciprocatory knitting-cam; immediately following by a corresponding depressing-cam, substantially as described.

6. In a circular-knitting machine a cam-cylinder fitted with two substantially parallel stitch-cams in close proximity to each other and having a common return-way; means for sorting the needles into groups and deflecting said groups alternately into the range of one or the other of said stitch-cams, by virtue of which those needles which are deflected into the range of the first of the two stitch-cams are not previously raised sufficiently to throw the loops which they carry below their latches; a raising-cam in advance of both said stitch-cams and the sorting means, whereby all of the needles are advanced sufficiently to throw the loops which they carry below their latches; and a depressing-cam immediately following said raising-cam, whereby they are all returned to the normal level before reaching said sorting means, substantially as described.

7. In a circular-knitting machine fitted with a set of reciprocatory knitting-cams a raising-cam in advance of that one of the reciprocatory set which leads during full knitting; a removable depressing-cam immediately following said raising-cam, which when in position returns all of the needles before they reach the reciprocatory set; sorting means whereby some of the needles are passed across the leading stitch-cam without being advanced by it, while the other needles are advanced by it in the regular way; a supplemental stitch-cam intermediately placed with relation to the regular stitch-cams of the reciprocatory set whereby those needles which have been passed across the leading stitch-cam are depressed in a separate line from those which are depressed by the following stitch-cam; and two thread-guides each feeding a separate thread into the two lines of descending needles, substantially as described.

8. In a circular-knitting machine a needle-cylinder fitted with needles having long and short butts and arranged in alternating groups; a cam-cylinder with a set of reciprocatory knitting-cams of which that stitch-cam which leads during full knitting is provided with a transverse channel of partial depth across which the short-butt needles are led without preliminary advance by the leading stitch-cam, while the long-butt needles are thus advanced; a supplemental stitch-cam intermediately placed with reference to the regular stitch-cams of the reciprocatory set, the upper edge of which reaches only to those needles which have failed to advance by reason of their having been led across the transverse channel of the leading stitch-cam; a movable raising-cam in advance of the reciprocatory set whereby when it is set in its position all of the needles may be caused to pass over the leading stitch-cam; and two thread-guides feeding separate threads, the one into the needles which are depressed by the supplemental stitch-cam, and the other into the needles which are depressed by the regular following stitch-cam, substantially as described.

9. In a circular-knitting machine a cam-cylinder fitted with a set of reciprocatory knitting-cams; means whereby certain of the needles are passed across the leading stitch-cam, without preliminary advance by it; a supplemental stitch-cam whereby these needles are depressed in a separate line from those which after passing over the leading stitch-cam are depressed by the following stitch-cam; and two thread-guides at different heights, the lowermost of which feeds its thread to the needles which are depressed by the special stitch-cam, while the other feeds its thread to the needles which are depressed by the regular following stitch-cam, substantially as described.

10. In a circular-knitting machine a cam-cylinder fitted with a set of reciprocatory knitting-cams; means whereby certain of the needles are passed across the leading stitch-cam, without preliminary advance by it; a supplemental stitch-cam whereby these needles are depressed in a separate line from those which after passing over the leading stitch-cam are depressed by the following stitch-cam; two separate thread-guides, one feeding its thread to the needles which are depressed by the special stitch-cam, and the other feeding its thread to the needles which are depressed by the regular following stitch-cam; and a sinker-ring provided with sinkers, with means whereby the sinkers are temporarily advanced in the region of the point where the thread which is fed to the needles which are depressed by the special stitch-cam is knit, substantially as described.

11. In a circular-knitting machine a cam-cylinder fitted with a set of reciprocatory knitting-cams; a special stitch-cam intermediately placed between the regular stitch-cams of the reciprocatory set; means whereby certain of the needles are deflected across the face of the leading stitch-cam without being advanced by it and into the range of the special stitch-cam; while the other needles after being advanced by the leading stitch-cam are depressed by the following stitch-cam in the usual manner, and two thread-guides coöperating the one with the needles which are actuated by the special stitch-cam, and the other with the needles which are actuated by the following stitch-cam, whereby separate threads are fed into each set for the production of striped knitting; substantially as described.

12. In a circular-knitting machine a cam-cylinder fitted with a set of reciprocatory knitting-cams; a special stitch-cam intermediately placed between the regular stitch-cams of the reciprocatory set; means whereby certain of the needles are deflected across the face of the leading stitch-cam without being advanced by it and into the range of the special stitch-cam; while the other needles after being advanced by the leading stitch-cam are depressed by the following stitch-cam in the usual manner; and a raising and depressing cam in advance of the set of reciprocatory knitting-cams, whereby all of the needles are preliminarily advanced and returned, and two thread-guides coöperating the one with the needles which are actuated by the special stitch-cam, and the other with the needles which are actuated by the following stitch-cam, whereby separate threads are fed into each set for the production of striped knitting; substantially as described.

13. In a circular-knitting machine a cam-cylinder fitted with a set of reciprocatory knitting-cams; a special stitch-cam intermediately placed between the regular stitch-cams of the reciprocatory set; means whereby certain of the needles are deflected across the face of the leading stitch-cam without being advanced by it and into the range of the special stitch-cam; while the other needles after being advanced by the leading stitch-cam are depressed by the following stitch-cam in the usual manner; a sinker-ring fitted with a special sinker-cam, whereby the sinkers are temporarily advanced in the region corresponding to the depression of certain of the needles by the special stitch-cam, and two thread-guides coöperating the one with the needles which are actuated by the special stitch-cam, and the other with the needles which are actuated by the following stitch-cam, whereby separate threads are fed into each set for the production of striped knitting; substantially as described.

In witness whereof we, JOHN B. PAXTON and ELLIS I. O'NEILL, have hereunto signed our names with two subscribing witnesses.

JOHN B. PAXTON.
ELLIS I. O'NEILL.

Witnesses:
JAMES H. BELL,
M. K. TRUMBORE.